Dec. 20, 1932.   R. W. MEATHERINGHAM   1,891,478
AUTOMOBILE WINDOW STRUCTURE
Filed June 23, 1931
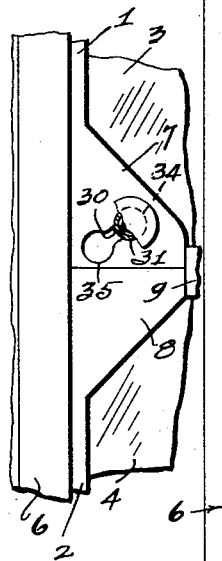
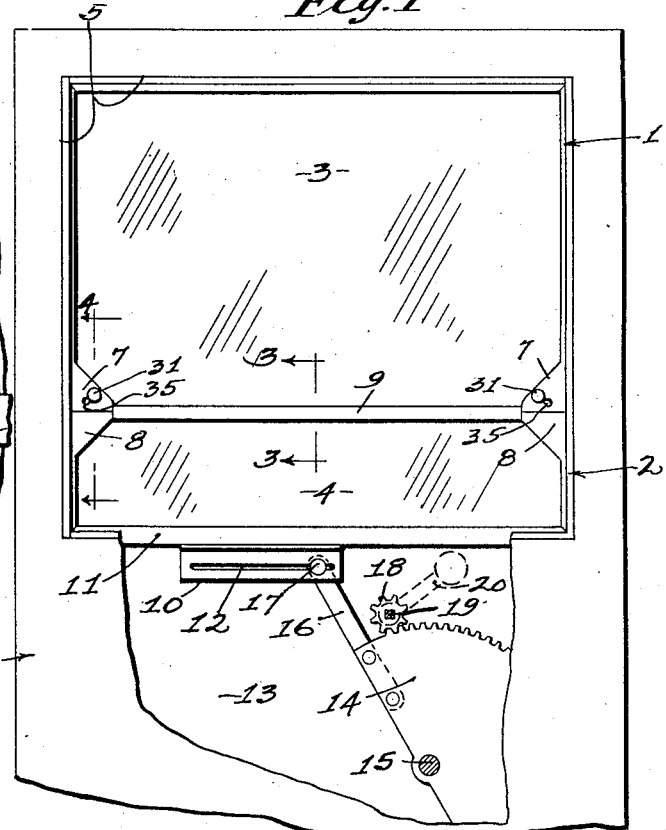
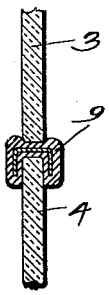
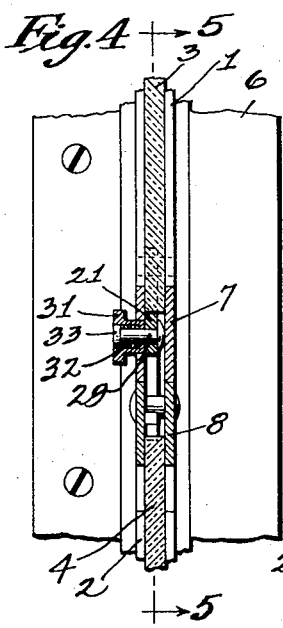
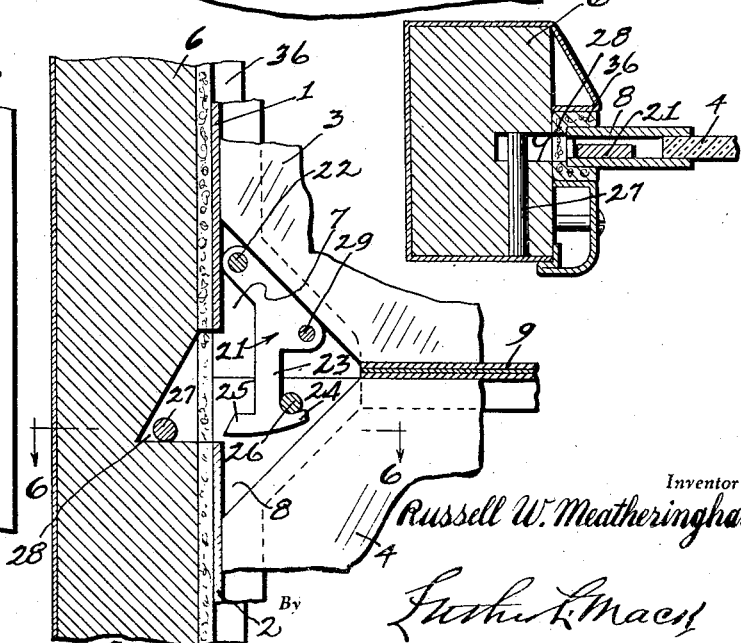
Inventor
Russell W. Meatheringham
Attorney Patented Dec. 20, 1932

1,891,478

UNITED STATES PATENT OFFICE

RUSSELL W. MEATHERINGHAM, OF SAN MARINO, CALIFORNIA

AUTOMOBILE WINDOW STRUCTURE

Application filed June 23, 1931. Serial No. 546,188.

This invention relates to and has for an object the provision of an improved type of automobile window structure embodying a main and an auxiliary sash mounted preferably on the door but capable also of being mounted on stationary portions of an automobile body, and so arranged that the two sashes may be raised and lowered together as a unit, or that one of the sashes may be lowered without lowering the other sash.

This type of window structure is particularly adaptable to the left hand front door of a closed automobile body at a point adjacent the driver's compartment. Usually the glass window sashes which are mounted in the doors of a sedan or other type of closed automobile body have but one glass which is raised and lowered to a desired extent by a suitable mechanism and sealed within the lower portion of the door.

The present day traffic regulations require hand signals to indicate changes in direction or the stopping of a vehicle, thus necessitating the complete opening of a window in order to give such signals. It is an object of this invention, therefore, to provide a window including a pair of sashes, the uppermost of which is of substantially larger size than the lower sash, together with means for detachably connecting the two sashes in order that both the sashes may be raised or lowered together as a unit, or the lower sash may be detached from the upper sash and lowered independently thereof to permit the extension of the operator's hand from the window for the purpose of signaling. In inclement weather, particularly during a rain or wind storm, to completely open the window in order to give a signal is discomforting, but by providing the two sashes detachably connected together, under such conditions the upper sash may remain closed while the lower sash is opened temporarily or continuously.

To this end this invention contemplates the provision of a simple, economical and effective window structure capable of operation as a unit, as in other single sash windows, but also capable of independent operation as mentioned herein, for the purpose described.

Other objects may appear as the description progresses.

In the accompanying drawing I have shown a preferred form of invention subject to modification within the scope of the appended claims, without departing from the spirit thereof. In said drawing, Fig. 1 is an inner side elevation of an automobile door equipped with my improved window structure.

Fig. 2 is an enlarged fragmentary view of a portion of the same.

Fig. 3 is a fragmentary section of the window on line 3—3 of Fig. 1.

Fig. 4 is a section of the same on line 4—4 of Fig. 1.

Fig. 5 is an enlarged fragmentary section showing details of the structure on line 5—5 of Fig. 4.

Fig. 6 is a transverse section of the door and window on line 6—6 of Fig. 5.

In the provision of my improved window structure it will be understood that no radical changes are required in a standard automobile door or window, and any standard type of window raising or lowering mechanism may be employed in connection with my improvements.

As generally arranged, in lieu of a single sash I provide an upper sash 1 and a lower sash 2, which preferably have metal frames and ordinary glass panes 3 and 4 arranged in the usual window opening 5 provided in the door 6. It will be observed that the sash 1 is substantially larger than the sash 2 and the frame extends around the top and sides of the glass 3 while the frame of the glass 4 extends around the bottom and sides thereof.

The sash 1 is provided with triangular corner portions 7, 7 at the bottom while the sash 2 is provided with similar portions 8, 8 at the top thereof, which abut the portions 7, 7. Any suitable kind of weather strip, as at 9, may be fixed to or supported on the upper edge of the glass 4 or the lower edge of the glass 3 so as to fill the space between the two panes when the sashes 1 and 2 are attached together in closed position, as shown in Fig. 1.

Any suitable form of raising and lowering mechanism may be attached to the lower sash 2, but I have shown a typical form of device which includes a plate 10 attached to the lower rail 11 of sash 2 and provided with an elongated slot 12 therein. In a compartment 13 below the window and formed in the door 6 a sector 14 is pivotally mounted at 15 and has an arm 16 extending radially therefrom with a roller 17 on its end which movably engages the slot 12.

Above the sector 14 a pinion 18 is mounted on an operating shaft 19 and is meshed with the sector 14. A handle 20 is usually provided on the inside of the door 6 and is fixed to the shaft 19 for rotating the pinion 18 and correspondingly rotating the sector 14. Thus, as seen in Fig. 1, when the handle 20 is rotated in a clock-wise direction the sector 14 will be rotated for a fraction of a revolution in a counter-clockwise direction and the roller 17 will move to the left in the slot 12 and thereby lower the sashes 3 and 4 together or the sash 4 independently of the sash 3, as hereinafter explained.

A reverse movement of the handle 20 will in like manner raise the sash or sashes to partially or completely closed positions in the window opening 5.

The sashes 1 and 2 are detachably connected together at the two sides thereof by means of latches, as at 21, which are mounted within the recesses of the members 7, 7 of sash 1 on pins or screws 22. Each of said latches is provided with a depending extension 23 which projects into the recess of the corner members 8, 8 of sash 2, and oppositely projecting portions 24 and 25 are formed on the lower end of said latch for selective engagement with pins or abutments 26 and 27. When the sashes are attached together the hooks 24 engage the lower sides of the pins 26, as shown in Fig. 5, while the portions 25 are disengaged from the pins 27.

It will be noted that the pins 27 are seated within recesses 28 of the door 6, but in lieu of the pins any other suitable abutment may be employed.

Thus, when the sashes are connected together as shown in Figs. 1 and 5, the operation of the handle 20 in opposite directions will simultaneously raise and lower the two sashes as a unit.

Each of said latches 21 has a pin 29 fixed thereto and projecting outwardly thru a slot 30 formed in the corner members 7 of sash 1. An operating knob 31 is yieldably attached to the end of the pin 29 and is preferably arranged with a spring 32 held in compression between the inner end of the knob 31 and a head 33 on pin 29. The slots 30 which are formed in the members 7, 7 are provided with enlarged circular terminal portions 34 and 35 which receive the skirts of the knobs 31 for holding the latches 21 in closed position, as shown in Fig. 5, or in open positions with the sashes detached.

Thus the latches 21 are operated by pulling the knobs 31 outwardly from the portions 34 of the slots 30 and moving the knobs until said skirts register with the portions 35 of said slots, whereupon the tension of the springs 32 will be effective for receding the skirts of the knobs in the portions 35 for holding the latches 21 engaged with the pins 27, thereby stationarily supporting the sash 1 in closed position while permitting the sash 2 to be raised or lowered independently of the sash 1.

The sashes 1 and 2, as usual, are slidably mounted in felt covered channels 36 formed in the stiles and upper rail of the door 6. By arranging the sashes 1 and 2 as described herein it will be quite apparent that the lower sash being operable independently of the upper sash greater comfort will be provided for the operator of a motor vehicle when it becomes necessary to give hand signals for indicating contemplated stopping or change in the direction of the vehicle, and all of the advantages of a single sash window are available, together with the additional advantage of the separable sashes.

What I claim is:

1. A window structure comprising, in combination with a frame having a window opening therein, a pair of separately framed sashes detachably connected together and slidably mounted in said frame for closing said opening, means for raising and lowering said sashes, and means enclosed in the frame of one of the sashes and connected with the other sash for operatively connecting the sashes for simultaneous opening and closing, and adjustable for disconnecting the sashes to permit the lowering of one sash independently of the other sash.

2. A window structure comprising, in combination with a frame having a window opening therein, a pair of separately framed sashes detachably connected together and slidably mounted in said frame for closing said opening, means for raising and lowering said sashes, and means housed in a reccess of one of the sash frames and connected with means in the other sash frame for operatively connecting the sashes for simultaneous opening and closing and adjustable for disconnecting the sashes to permit the lowering of one sash independently of the other sash, said last mentioned means including devices for stationarily supporting the one sash while the other sash is opened or closed.

3. An automobile window structure comprising a frame having an opening therein, a pair of separately framed sashes mounted in a common plane in said opening and in abutting relation, said sash frames having adjoining recesses near one side of the window opening means mounted on said frame for raising and lowering said sashes, and means mounted in recesses of said sash frames for detachably connecting said sashes whereby both of said sashes may be operated as a unit and one of said sashes may be operated independently of the other sash.

4. An automobile window structure comprising a frame having an opening therein, a pair of sashes mounted in a common plane in said opening and in abutting relation, frames around said sashes having adjoining recesses therein, latch members in said recesses connecting said sashes together for simultaneous opening and closing and operable at will for disconnecting said sashes to permit independent operation of one of the sashes relative to the other, and an operating mechanism mounted on said frame and connected with one of said sashes.

5. An automobile window structure comprising a frame having an opening therein, an upper sash and a lower sash slidably mounted in said opening, separate frames for said sashes, a window raising and lowering mechanism operatively connected with the lower sash, and cooperating means in and enclosed by said sash frames for detachably connecting said sashes together whereby both sashes may be raised and lowered simultaneously and the lower sash may be raised and lowered independently of the upper sash.

RUSSELL W. MEATHERINGHAM.